United States Patent [19]
Wirth

[11] 3,874,488
[45] Apr. 1, 1975

[54] ELECTRIC CORD RETRIEVING DEVICE

[76] Inventor: Robert Benson Wirth, 117 W. Main St., Woodland, Calif. 95695

[22] Filed: Apr. 25, 1973

[21] Appl. No.: 354,239

[52] U.S. Cl. .......................... 191/12 R, 137/355.25
[51] Int. Cl. ............................................. H02g 11/00
[58] Field of Search ............ 191/12.2 R, 12.4, 12 R; 137/355.17, 355.24, 355.25, 355.26; 254/149, 136, 178

[56] References Cited
UNITED STATES PATENTS

| | | | |
|---|---|---|---|
| 1,379,562 | 5/1921 | Hecker | 137/355.17 |
| 1,918,657 | 7/1933 | Millar | 191/12.2 R |
| 2,439,010 | 4/1948 | Lange | 191/12 R |
| 3,227,802 | 1/1966 | Pressley | 191/12.4 |

Primary Examiner—M. Henson Wood, Jr.
Assistant Examiner—D. W. Keen

[57] ABSTRACT

A cord retrieving device for appliances, consisting primarily of a box mounted within the wall, having a multiple plug receiving bar member from which the electric cords extend, the cords having a pulley attached weight.

4 Claims, 7 Drawing Figures

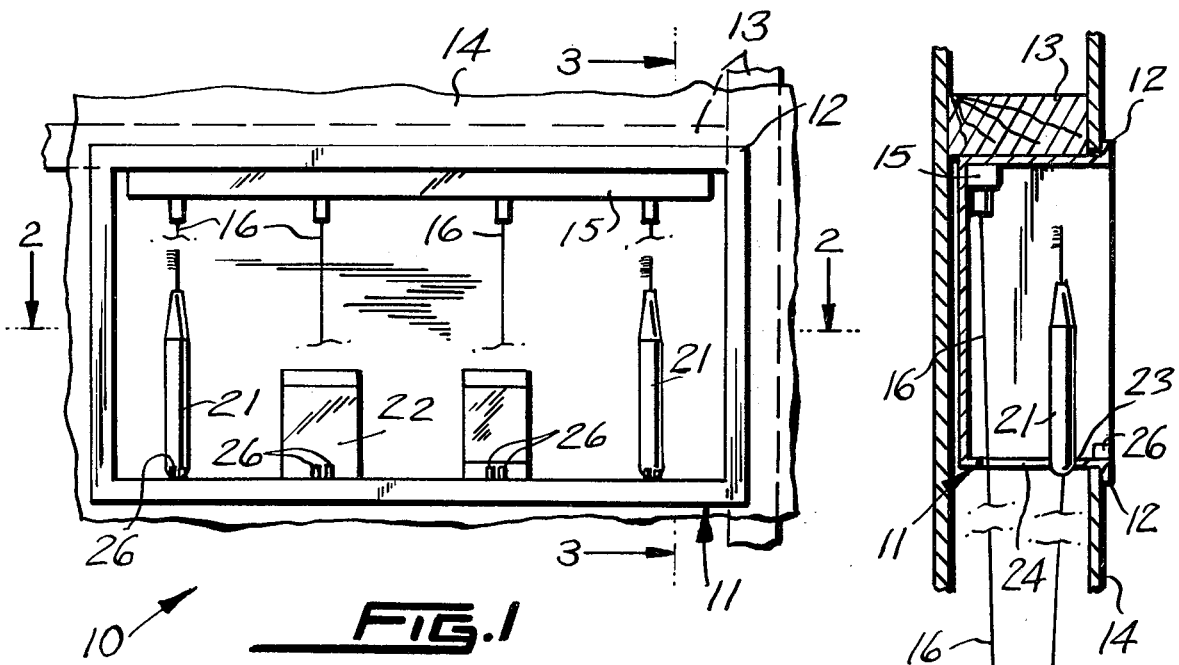
FIG.1
FIG.3
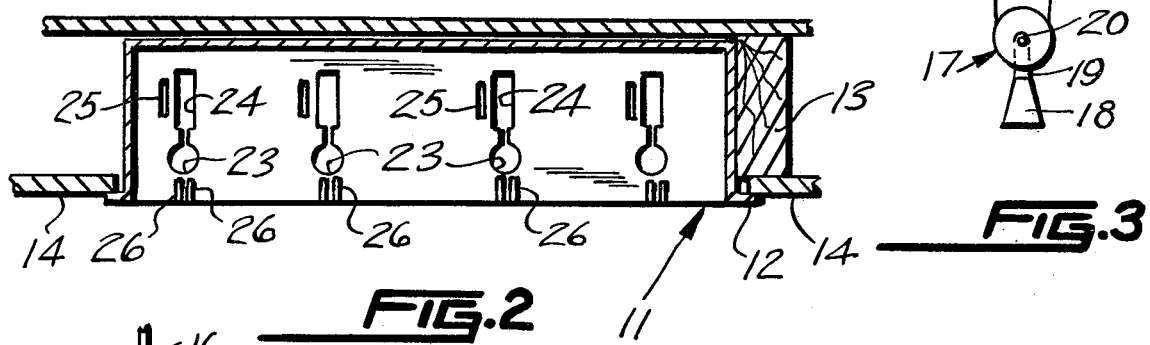
FIG.2
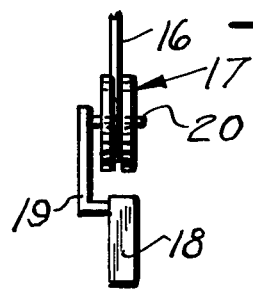
FIG.4
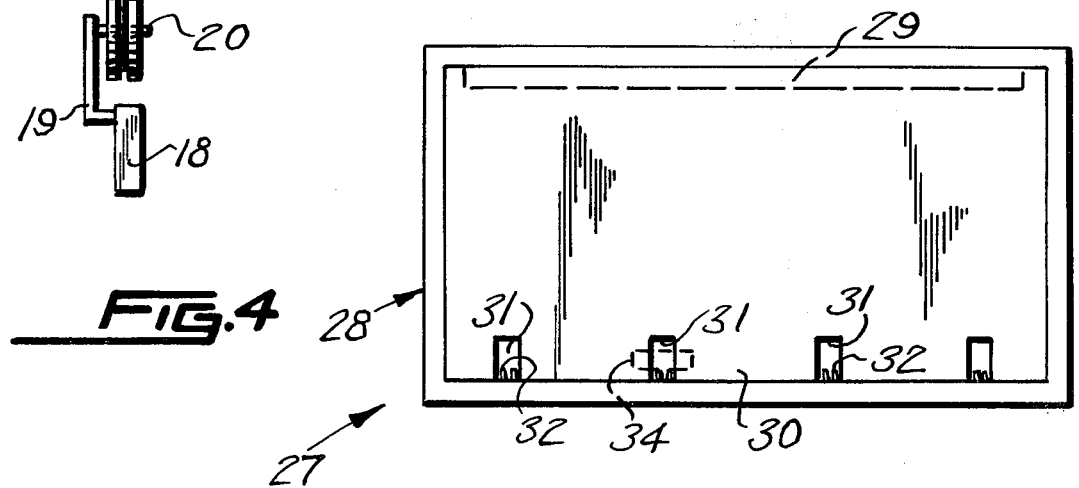
FIG.5

ELECTRIC CORD RETRIEVING DEVICE

This invention relates to electrical appliance cords and more particularly to an electrical cord retrieving device.

It is therefore the principal object of this invention to provide a cord retrieving device which will enable appliances to be easily handled when in use and the cord will be automatically returned into the cabinet or the like in which the appliances will rest when not in use.

Another object of this invention is to provide a cord retrieving device of the type described which will include a cabinet or housing in which will be secured a multiple plug receiving device from which the cord to the appliance will depend, a weight and pulley providing gravity means for re-entering the cord into the lower portion of the cabinet portion of the device.

Still another object of this invention is to provide a cord retrieving device of the type described which will handle a plurality of appliances, such as, toothbrushes, electric razors and the like.

Other objects of the invention are to provide a cord retrieving device which is simple in design, inexpensive to manufacture, rugged in construction, easy to use and efficient in operation.

These and other objects will be readily evident upon a study of the following specification together with the accompanying drawings wherein:

FIG. 1 is a fragmentary front view of the present invention shown secured within a wall;

FIG. 2 is a cross-sectional view taken along the line 2—2 of FIG. 1;

FIG. 3 is a cross-sectional view taken along the line 3—3 of FIG. 1;

FIG. 4 is an enlarged side view of one of the weighted pulleys of the device shown in elevation;

FIG. 5 is a front view showing a modified form of the invention which is shown in elevation;

Figure 6:
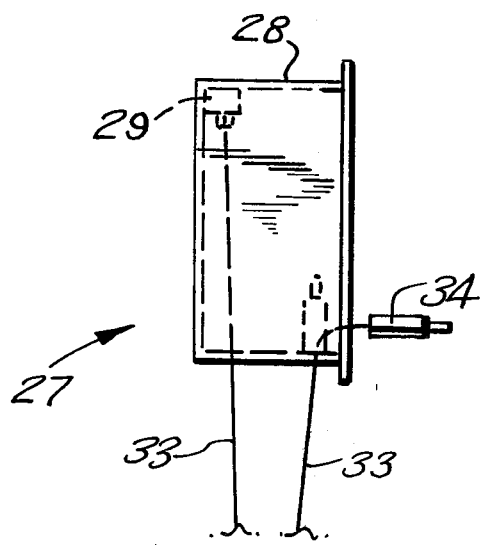
FIG. 6 is a side view of FIG. 5.

According to this invention, a cord retrieving device 10 is shown to consist of a hollow rectangular configurated box 11 having a front flange 12 which edges wall 14, the box 11 being secured in a suitable manner (not shown) to the wall studs 13. A multiple cord receiving receptacle 15 is secured within the box 11 at its upper extremity and receives the electric cords 16. Carried upon the electric cords 16 is a pulley 17 from which depends a counterweight 18 carried upon bracket 19, the bracket 19 having an extending shaft 20 which freely carries the pulley 17. The cords 16 are terminated by various electrical appliances, such as electric toothbrushes, 21, and an electric razor 22. The weight 18 by gravity means will retrieve the cords 16 and enables the appliances 21 and 22 to be replaced within box 11.

The openings 23 serve as resting means for the appliances 21 and 22 and the rectangular opening 24 enables the pulley 17 and its associated weight 18 to be lifted outwards or inwards of box 11. The adjacent slots 25 of openings 24 provides for standby storage position for appliances 21 and 22, the edge of the pulley 17 being positioned within the slot 25.

Use of the appliances 21 and 22 is accomplished by pulling them away from the box 11 and encroaching the cords 16 within the fixed holding fingers 26 when a desired length of cord 16 has been played out of box 11 for use of the appliances 21 and 22.

When it is desired to replace the appliances 21 and 22, the cord 16 is removed from the holding fingers 26 and the weight 18 carried by pulley 17 by gravity means will retrieve the cord 16 into the lower position behind the wall 14.

Referring now to FIGS. 5 and 6 of the drawing, one will see a modified form of cord retrieving device 27 consisting of a rectangular configurated box 28. Box 28 carries a multiple cord receiving receptacle 29 into which kitchen appliances may be entered. The front panel 30 of box 28 is provided with a plurality of spaced apart openings 31 for playing out cord therefrom. Device 27 also includes fingers 32 which are stationary within the openings 31, and provides a means for encroaching upon the cord 33 in order that the appliance 34 may be easily used until it is desired to replace the appliance 34 within the box 28.

It shall be noted that device 27 also utilizes a pulley and weight (not shown) as heretofore described in the main embodiment of the present invention.

Figure 7:
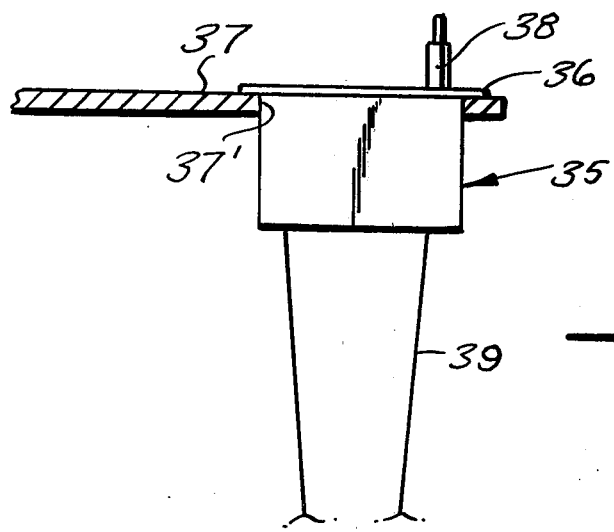
FIG. 7 is an end view of a counter mounted modified form of the invention.

Referring now to FIG. 7 of the drawings, one will see a modified form of table mounted device 35 having a flange 36 for resting upon the table 37, the device 35 being received within opening 37'.

Device 35 is similar in operation to that of the embodiment heretofore described, the cords 39 extending beneath the box portion within the table 37.

What I now claim is:

1. An electric cord retrieving device, comprising a hollow rectangular configurated box for receiving the appliances, a cord receiving receptacle carried within said box for plugingly carrying a plurality of cords of said appliances, a pulley and a weight carried by said cords of said appliances for gravity feeding said cords downwards below said box, a plurality of spaced apart and parallel fingers carried by said box for rendering said cord stationary when said appliances are removed from said box for use, said box being provided with an outwardly extending flange for abutting with the walls said box is mounted in, said box being secured to the studs of said wall by suitable fasteners and the opened face of said box freely receiving any one of said appliances when desired.

2. The combination according to claim 1, wherein said multiple cord receiving receptacle within said box is secured to the rear upper extremity on the interior of said box, the cords depending therefrom through openings within the bottom wall of said box, each of said cords carrying a pulley from which depends a weight for automatically urging said cord back into said box when said appliance is not in use.

3. The combination according to claim 2, wherein said weights of said pulley are secured to a bracket, said bracket having shaft means which freely receives said pulley which is carried upon said cord, said pulley and said weight, in combination, forming gravitation means for retrieving said cord of said appliance into said lower portion below said box within said wall.

4. The combination according to claim 3, wherein opening means within said bottom wall of said box enables said appliance to be supported when not in use and an extension of said opening provides a means for entering said pulley and said weight into a lower portion of said area below said box behind said wall and an adjacent opening of elongated configuration, enables the edge of a pulley of said device to be placed in stand by storage position, the cord holding fingers being positioned towards the front opening of said box, said cord holding fingers being parallel and encroachingly receiving said cord when said appliances are in use, said fingers thus preventing said weight of said cord from retrieving said cord into the lower portion beneath said box behind said wall.

* * * * *